Sept. 18, 1934.     L. J. BAKER ET AL     1,973,791
GAS SAVING DEVICE
Filed March 10, 1933

INVENTORS
Lewis J. Baker
Fred E. Larman
BY Charles R. Baker
F. N. Gilbert
ATTORNEY Patented Sept. 18, 1934

1,973,791

UNITED STATES PATENT OFFICE 1,973,791

GAS SAVING DEVICE

Louis J. Baker, Fred E. Laman and Charles R. Baker, Chenango, N. Y., assignors of one-fifth to William T. Anderson, Union, N. Y., and one-fifth to William H. Day, Binghamton, N. Y.

Application March 10, 1933, Serial No. 660,322

3 Claims. (Cl. 67—120)

Our device pertains to an improvement in gas saving devices, and in producing a hotter flame and increased pressure and rendering the gas service more effective for the consumer and a more effective control of gas consumption by the user. It also provides a simple method of application and mounting of the same and the control of the gas after passing the meter and into the hands of the consumer.

With these objects in view our invention consists in certain novel features of construction and arrangement of parts as will be hereinafter fully described and pointed out in the claims, reference being made to the accompanying drawing in which:

The same reference characters denote like parts in each of the several figures of the drawing.

Figure 1:
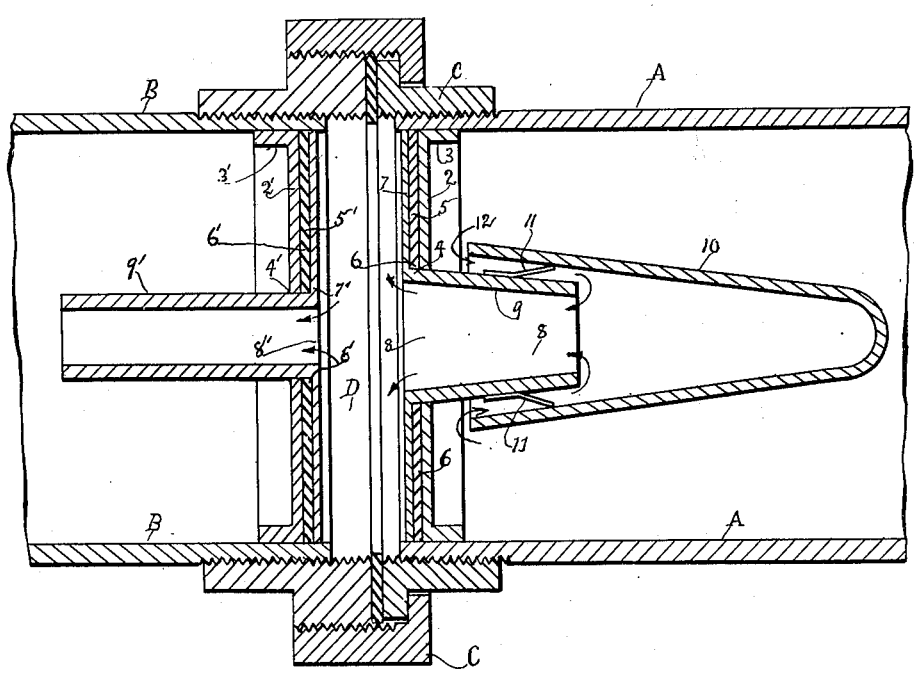
Fig. 1 is a side view of our device in cross section mounted in a gas pipe union.
Figure 2:
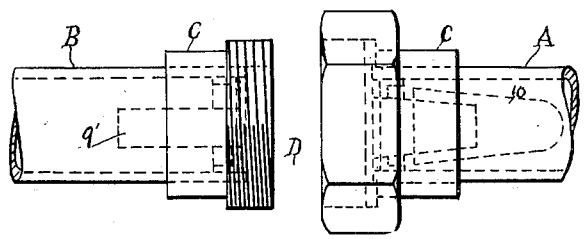
Fig. 2 is a perspective view of gas pipe unions partly separated with our device located therein.

In carrying out our invention we provide a gas control which is mounted in the gas pipe at the point of union between opposite lengths of gas pipe A and B, as shown in Figs. 1 and 2. Our device is formed of two parts, one part mounted in the outer end of pipe B. It is to be understood in use that each pipe has the usual threaded outer surface and on the point of union is the usual shaped coupling line C for uniting the pipe ends together.

As a further part of our device and in positioning the two parts of the same we mount in pipe A an interior disk shaped part 2, having on its outer edge the projecting flange 3 and having a central opening in the body 4. This disk may be tightly fitted in the interior of the pipe A. Next to the disk 2 we mount a rubber gasket 5, adjacent to disk 2 and having a central opening therein 6.

As a further part of our device we mount in pipe A and adjacent to the rubber gasket a metal disk shaped part 7 having the central opening therein 8 and from which opening 8 and integral with the disk body projects inward from the opening 8, a tapering tube projection 9 which in position passes into the pipe A and through openings 6 and 8 respectively above mentioned. Positioned on the inner tapering tube 9 we mount a tapering cap 10, which extension cap 10 with closed outer end is larger in diameter than the projecting tube 9 and which cap 10 is slidably mounted on the tube 9 by means of the bent spring lugs 11, 11, which by pressure holds the end cap 10 in correct horizontal position in pipe A, and with its inner surface apart from contact with the outer surface of the tapering tube 9 allowing a free opening for flowing gas to pass around the outside of 9 and into the outer open end thereof, in the flow of the gas, as the arrow points.

As a further part of our invention we have also mounted in the outer end of pipe B an interior disk 2', entered in pipe B and having on its edge an inward projecting flange 3' and having through it the central opening 4'. This disk also is fitted in the interior of pipe B. Next adjacent to disk 2' we mount a circular rubber gasket 5' adjacent to disk 2 and having through it the central opening therein 6.

As a further part of our device we mount in pipe B adjacent to the rubber gasket 5' a circular metal disk 7' and having through it the central opening 8' and from which opening and integral with the interior disk 7' projects a tube 9' which passes into pipe B and through the disk openings 6' and 8' respectively. Thus there is formed between the end of pipe A and the end of pipe B when joined by the coupling A and between the respective tubes 9 and 9' an expanding chamber D; in operation, the gas after passing through the meter passes along pipe A, thence around the end of cap 10 and into the interior of cap 10 at the open end 12 and thence into the open end of the tapering tube 9 and out of pipe 8 and into expanding chamber D and from chamber D it passes into tube 9' and thence on into pipe B to the user.

It is found by careful experiment that this flow of gas in this method and under this control is reduced in pressure under which gas is ordinarily forced through the supply pipe and through the meter and without lessening the supply and flow of gas, thus permitting a great saving to be made to the consumer of gas.

Having thus described our invention, what we claim as new and for which we desire Letters Patent is as follows:

1. In a gas saving device, a gas control mounted in a gas pipe at the point of union between the opposite end of two pipe sections, in the outer end of one section an inner disk with a flange edge thereon, mounted in the gas pipe and an opening therethrough, adjacent to it, a rubber gasket, disk shaped, with opening therethrough, a front disk adjacent to gasket mounted in the pipe, a central opening therethrough, and from the opening and integral with disk, a tapering tubular projection in horizontal alignment passing inwardly and through the openings in the adjacent disks mentioned, a tubular tapering cap formation mounted over the tapering tube projection and of larger diameter supported on lugs on the exterior of the tapering tube formation, and in the open end of the opposite gas pipe section, a disk mounted in the pipe, the disk having a flanged edge and central opening therethrough, a disk shaped rubber gasket having a central opening therethrough and adjacent to the gasket, a metal disk having an opening therethrough and mounted in the opening and integral with the disk, a projecting horizontal tubular formation extending inwardly in the gas pipe and through the openings in the disks before mentioned, and of smaller diameter than the tapering tube mounted in the opposite gas pipe section, the two gas pipe ends spaced apart and coupled by a pipe coupling, all for the purpose described.

2. In a gas saving device, mounted in each opposite end of two sections of gas pipe, said ends being coupled by a union and spaced apart parallel adjacent disks with openings therethrough, one a rubber gasket and an outer disk of metal having through its central opening a tapering tubular projection extending inward through the openings in the adjacent disks in the one gas pipe section, and also a tapering tubular cap of larger diameter mounted on the tapering tubular projection, supported in any convenient manner on the tapering formation; in the opposite gas pipe section, three or more parallel adjacent disk formations with central openings therethrough and from the central opening of the outer disk an inward projecting tube of smaller diameter than the tubular formation, in the opposite section and projecting inward through the openings in the adjacent disk, forming a passage way for gas passing from the first gas pipe section into the chamber formed by the spaced apart gas pipe sections at the union, and into the gas pipe of the second section.

3. A gas saving device adapted to be mounted in two adjacent aligned sections of pipe and comprising a disk mounted adjacent the end of one of the pipes, said disk having a central aperture therethrough provided with a tube tapering in the direction of the source of flow of the gas, a second disk mounted adjacent the end of the other pipe section and provided with a tube extending toward the meter, said disks being spaced apart to form an intermediate chamber, and a cap fitted over the inward end of the tapering tube with its walls spaced therefrom, said cap being closed at its end nearest the source of flow of the gas, and tapering outwardly toward the meter side.

LOUIS J. BAKER.
FRED E. LAMAN.
CHARLES R. BAKER.